US006450496B2

(12) United States Patent
Hebert et al.

(10) Patent No.: US 6,450,496 B2
(45) Date of Patent: Sep. 17, 2002

(54) VARIABLE CROSS-SECTION VACUUM GROOVES IN AN EXTERNAL DRUM IMAGING SYSTEM

(75) Inventors: James J. Hebert, Manchester, NH (US); Philip A. Rombult, Boxford, MA (US)

(73) Assignee: Agfa Corporation, Wilmington, MA (US)

( * ) Notice: Subject to any disclaimer, the term of this patent is extended or adjusted under 35 U.S.C. 154(b) by 25 days.

(21) Appl. No.: 09/843,050

(22) Filed: Apr. 26, 2001

Related U.S. Application Data

(60) Division of application No. 09/358,957, filed on Jul. 22, 1999, and a continuation of application No. 09/358,957.

(51) Int. Cl.[7] .................................................. B65H 5/02
(52) U.S. Cl. ......................... 271/276; 271/3.22; 355/73
(58) Field of Search ................................. 271/276, 3.22; 355/73, 76

(56) References Cited

U.S. PATENT DOCUMENTS

| 4,324,487 A | * | 4/1982 | Nishihama | .................... | 355/73 |
| 5,099,277 A | * | 3/1992 | Lucht et al. | .................. | 355/73 |
| 5,563,683 A | * | 10/1996 | Kamiya | ........................ | 355/73 |
| 5,971,393 A | * | 10/1999 | Vernackt | ...................... | 271/276 |
| 6,254,091 B1 | * | 7/2001 | Hebert et al. | ................ | 271/276 |

* cited by examiner

Primary Examiner—Joseph E. Valenza
Assistant Examiner—Mark A. Deuble
(74) Attorney, Agent, or Firm—Robert A. Sabourin; Joseph D. King

(57) ABSTRACT

A method and apparatus for holding recording media against a media support surface of an imaging system using an arrangement of variable cross-section vacuum grooves. Each vacuum groove has a continuously decreasing cross-section along its length. Each vacuum groove has a maximum cross-section adjacent a vacuum port and a minimum cross-section at a distal end of the vacuum groove.

20 Claims, 7 Drawing Sheets

VARIABLE CROSS-SECTION VACUUM GROOVES IN AN EXTERNAL DRUM IMAGING SYSTEM

This application is a divisional continuation of U.S. patent application Ser. No. 09/358,957 filed on Jul. 22, 1999 by the same inventors.

FIELD OF THE INVENTION

The present invention is in the field of imaging systems. More particularly, the present invention provides a method and apparatus for holding recording media against a media support surface of an imaging system using an arrangement of variable cross-section vacuum grooves.

BACKGROUND OF THE INVENTION

In many imaging systems, such as imagesetters or platesetters, a movable optical carriage is used to displace a laser system or other imaging source in a slow scan direction along a curved or planar media support surface (e.g., flatbed, internal drum, external drum, or other support surface). The imaging source exposes a supply of recording media supported on, and held against, the media support surface. Generally, the imaging source includes an optical system for scanning one or more laser or other radiation beams modulated by an information signal over the recording media to record an image onto the recording media. For example, in an internal drum recording system, the imaging source may include a beam deflection assembly, comprising a deflector element (e.g., a mirror) and a spin motor for rotating the deflector element, wherein the beam deflection assembly deflects an imaging beam generated by a radiation source across the recording media.

The recording media to be imaged by an imaging system is commonly supplied in web form or in discrete sheets or plates. The recording media may comprise a photosensitive, radiation sensitive, thermally sensitive, or other type of imageable material. In a given imaging system, different size recording media may be used for different applications, depending on such factors as the type of image to be scanned, etc. Regardless of the size of the recording media that is used, however, it is important to hold the recording media firmly against the media support surface. Any lifting of the recording media away from the media support surface may result in an out of focus image on the recording media. This may be due, for example, to the fixed and short focal depth of the imaging beam., as well as other factors.

In many imaging systems, a vacuum system is employed to hold the recording media against the media support surface. Commonly, the vacuum system operates by drawing a vacuum through a plurality of vacuum ports, disposed over the media support surface, which draw air from a plurality of constant cross-section (e.g., constant depth and width) vacuum grooves. When a single vacuum source is used to draw air from each of the vacuum ports, larger recording media is held more firmly against the media support surface than smaller recording media because the larger recording media covers more of the vacuum ports or grooves. Analogously, smaller recording media is held less firmly against the media support surface than larger recording media because of the air loss through the vacuum ports or grooves not covered by the smaller recording media, or a drop in vacuum caused by constant cross-section groove drag and loss. This may become problematic when the recording media comprises a flat aluminum plate or the like which is to be held on a curved media support surface, since the vacuum forces required to hold the aluminum plate firmly against the media support surface may be quite substantial.

Many attempts have been made to provide a vacuum system capable of providing a sufficient vacuum for different size recording media. One such technique is described in U.S. Pat. Nos. 6,133,936 and 6,047,733, both incorporated herein by reference in their entirety. This technique employs a sequencing manifold to selectively draw a vacuum through a plurality of individually addressable vacuum sections depending on the size of the recording media. Unfortunately, such a vacuum and manifold system, although quite effective, is generally highly complex and expensive to produce.

SUMMARY OF THE INVENTION

The present invention provides a method and apparatus for holding recording media against an external drum media support surface of an external drum system using an arrangement of variable cross-section vacuum grooves.

Generally, in accordance with a preferred embodiment, the present invention provides an apparatus comprising:

an external drum media support s urface; and at least one variable depth vacuum groove in the media support surface.

Preferably, each vacuum groove has a continuously decreasing depth along its length, wherein the vacuum groove has a maximum depth adjacent a vacuum port and a minimum depth at a distal end of the vacuum groove. However, the depth of each vacuum groove may comprise, e.g., a series of stepped sections each having a gradually reduced depth. Other variable depth vacuum groove configurations are possible without departing from the scope of the present invention.

The present invention additionally provides a method for holding media on an external drum media support surface, comprising the steps of:

positioning the media over at least one variable depth vacuum groove in the media support surface; and applying a vacuum to the vacuum grooves.

Even more generally, the present invention provides an external drum imaging apparatus comprising:

external drum support surface; and at least one variable cross-section vacuum groove in the support surface.

The variable cross-section of each vacuum groove may be provided using any suitable method that provides a cross-section that decreases from a maximum adjacent a vacuum source/port to a minimum at a distal end of the vacuum groove. For example, as detailed above, a variable cross-section may be provided by varying the depth of the vacuum groove along its length (constant width). Alternately, a variable cross-section may be provided by varying the width of the vacuum groove along its length (constant depth). Further, a variable cross-section may be provided by varying both the depth and width of the vacuum groove along its length. Many other techniques or combination of techniques are also possible without departing from the scope of the present invention.

The present invention additionally provides an external drum imaging system comprising:

an external drum media support surface for supporting a supply of recording media;

at least one variable cross-section vacuum groove in the media support surface;

a system for applying a vacuum to each vacuum groove to hold the recording media against the media support surface; and a system for recording image data onto the recording media.

BRIEF DESCRIPTION OF THE DRAWINGS

The features of the present invention will best be understood from a detailed description of the invention and a preferred embodiment thereof selected for the purposes of illustration and shown in the accompanying drawings in which.

DETAILED DESCRIPTION OF THE INVENTION

Figure 1:
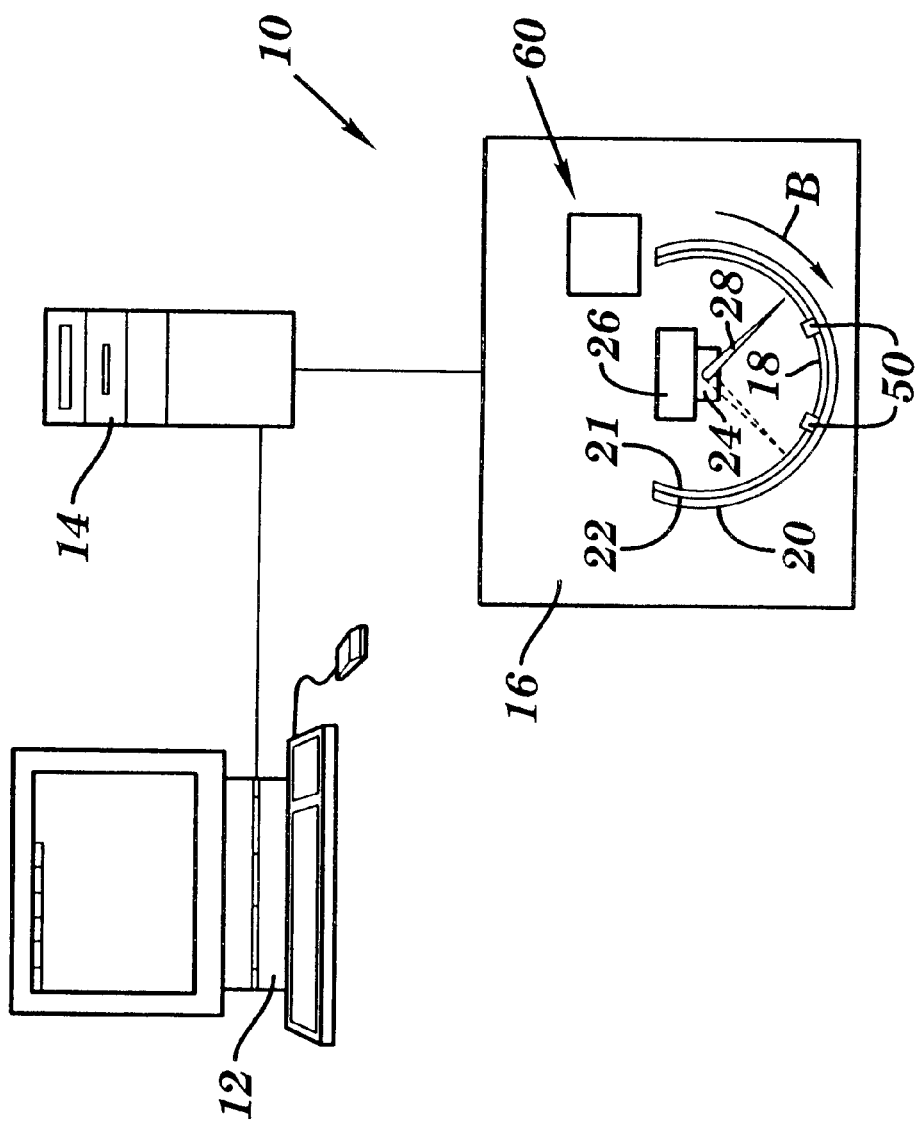
FIG. 1 illustrates an example of an imaging system for recording images onto a supply of recording media.

The features and advantages of the present invention are illustrated in detail in the accompanying drawings, wherein like reference numerals refer to like elements throughout the drawings. Although the drawings are intended to illustrate the present invention, the drawings are not necessarily drawn to scale.

An example of an imaging system 10 is illustrated in FIG. 1. In this example, the imaging system 10 comprises an internal drum imagesetter. configured to record digital data onto a supply of film, a printing plate, or other recording media. Although described below with regard to an internal drum imagesetter, the present invention may be used in conjunction with a wide variety of other types of internal drum, external drum, flatbed, or capstan type imaging systems, including platesetters and the like, without departing from the intended scope of the present invention as set forth in the claims.

The imaging system 10 generally includes a front end computer or workstation 12 for the design and layout of pages to be printed, a raster image processor (RIP) 14 for rasterizing the page data, and an imagesetter 16. The imagesetter 16 records the digital data provided by the RIP 14 onto a supply of photosensitive, radiation sensitive, thermally sensitive, or other type of suitable recording media 18. The recording media 18 is provided in web form or in discrete sheets or plates by a media supply system 60.

The imagesetter 16 includes an internal drum 20 having a cylindrical media support surface 22 for supporting and positioning the recording media 18 during imaging. The imagesetter 16 further includes a scanning system 24, carried by a movable optical carriage 26, for recording digital data onto the recording media 18 using an imaging beam 28.

At least one side punch 50 is positioned and attached in a known manner to an end of the internal drum 20. The punches 50 are used to punch a predetermined set of registration holes, notches, etc., in the recording media 18. By aligning the image recorded by the scanning system 24 onto the recording media 18 to the set of holes in the recording media 18, accurate registration throughout the prepress process can be achieved.

Figure 2:
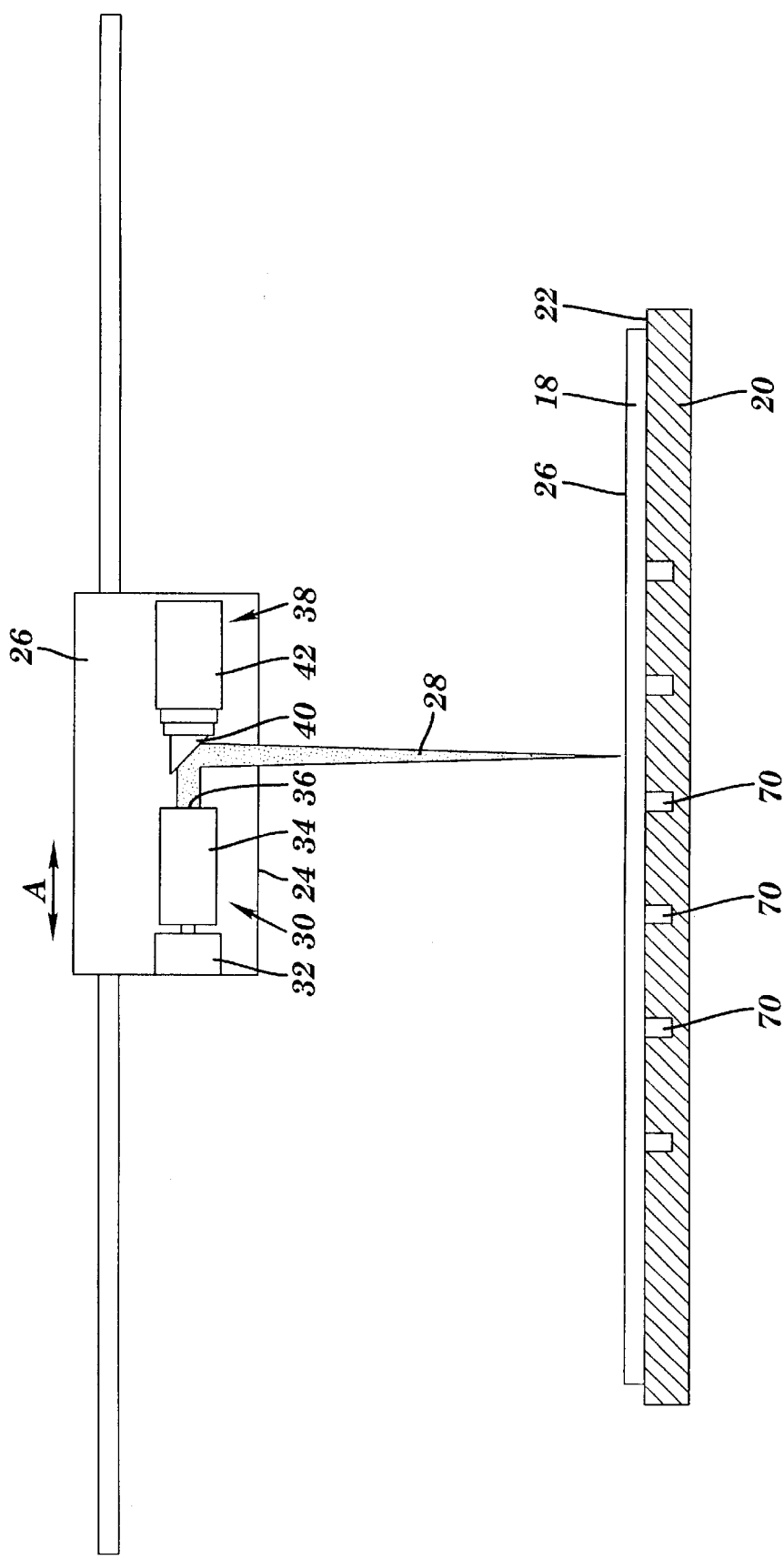
FIG. 2 illustrates the movable optical carriage, scanning system, and vacuum groove arrangement of the imaging system of FIG. 1.

As illustrated in FIG. 2, the scanning system 24 is displaced by the movable optical carriage 26 in a slow scan direction (directional arrow A) along the internal drum 20 to expose the recording media 18 in a line-wise manner. The optical carriage 26 is preferably displaced by an onboard drive system (not shown), although an external drive system may also be used.

The scanning system 24 typically includes a laser system 30 for generating the imaging beam 28. The laser system 30 comprises a light or radiation source 32 for producing the imaging beam 28, and an optical system 34 positioned between the radiation source 32 and the media support surface 22 for focusing the imaging beam 28 onto the recording media 18. The imaging beam 28 exits the optical system 34 through a spot focusing lens 36. The scanning system 24 further includes a beam deflection assembly 38 for deflecting the imaging beam 28 across the recording media 18 in a fast scan curvilinear direction B (see FIG. 1) to record a scan line on the imaging surface 21 of the recording media 18. The beam deflection assembly 38 comprises a deflector element 40 (e.g., a mirror) and a spin motor 42 for rotating the deflector element 40. As the deflector element 40 is rotated by the spin motor 42, the imaging beam 28 is scanned across the recording media 18 as shown in FIG. 1, thereby imaging a scan line on the recording media 18. The scanning system 24 described above is only one of many different types of scanning systems that may be used to record image data on the recording media 18.

Figure 3:
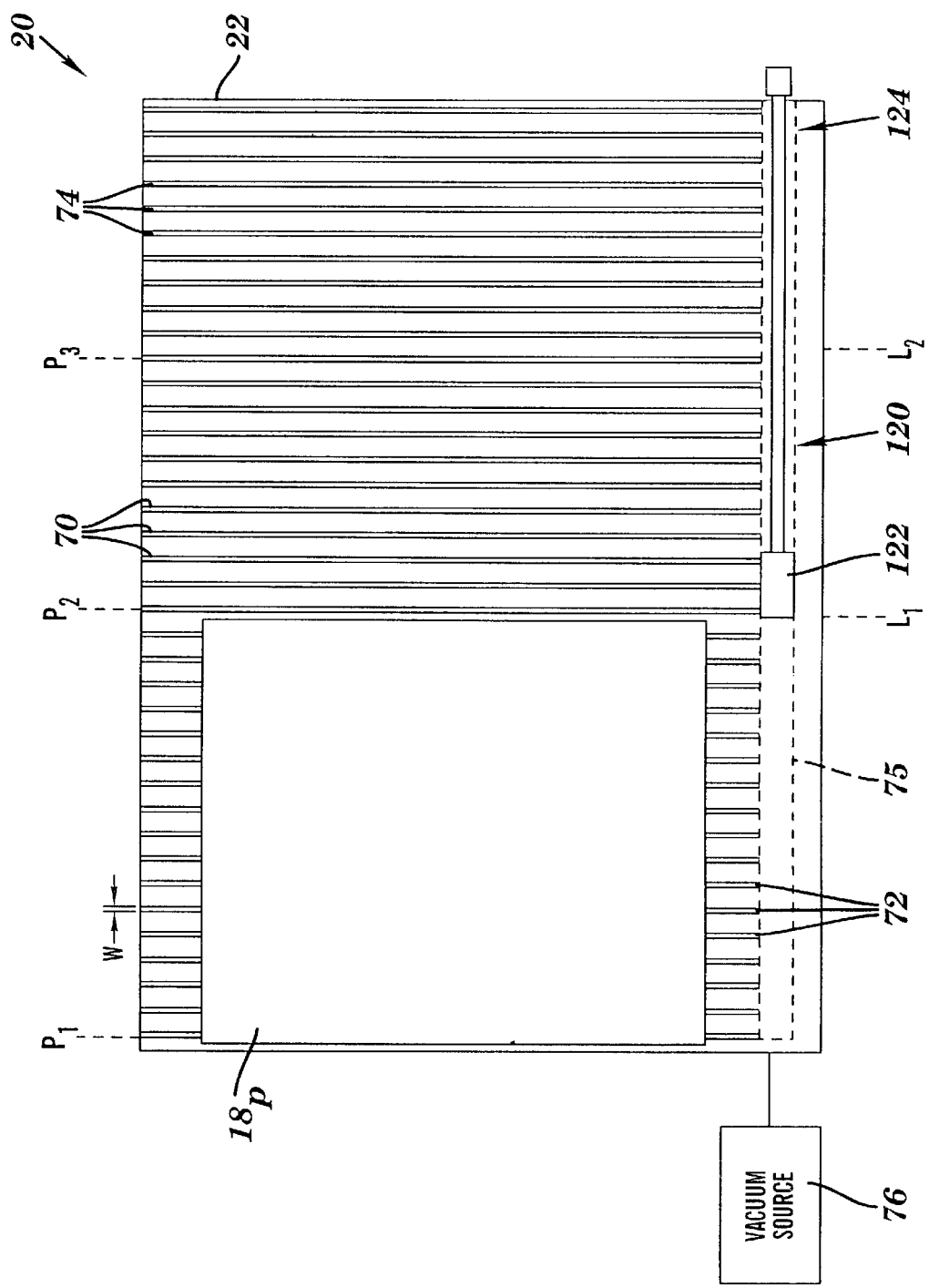
FIG. 3 is a partial plan view of the internal drum of the imaging system of FIG. 1, illustrating an arrangement of variable cross-section vacuum grooves in accordance with the present invention.
Figure 4:
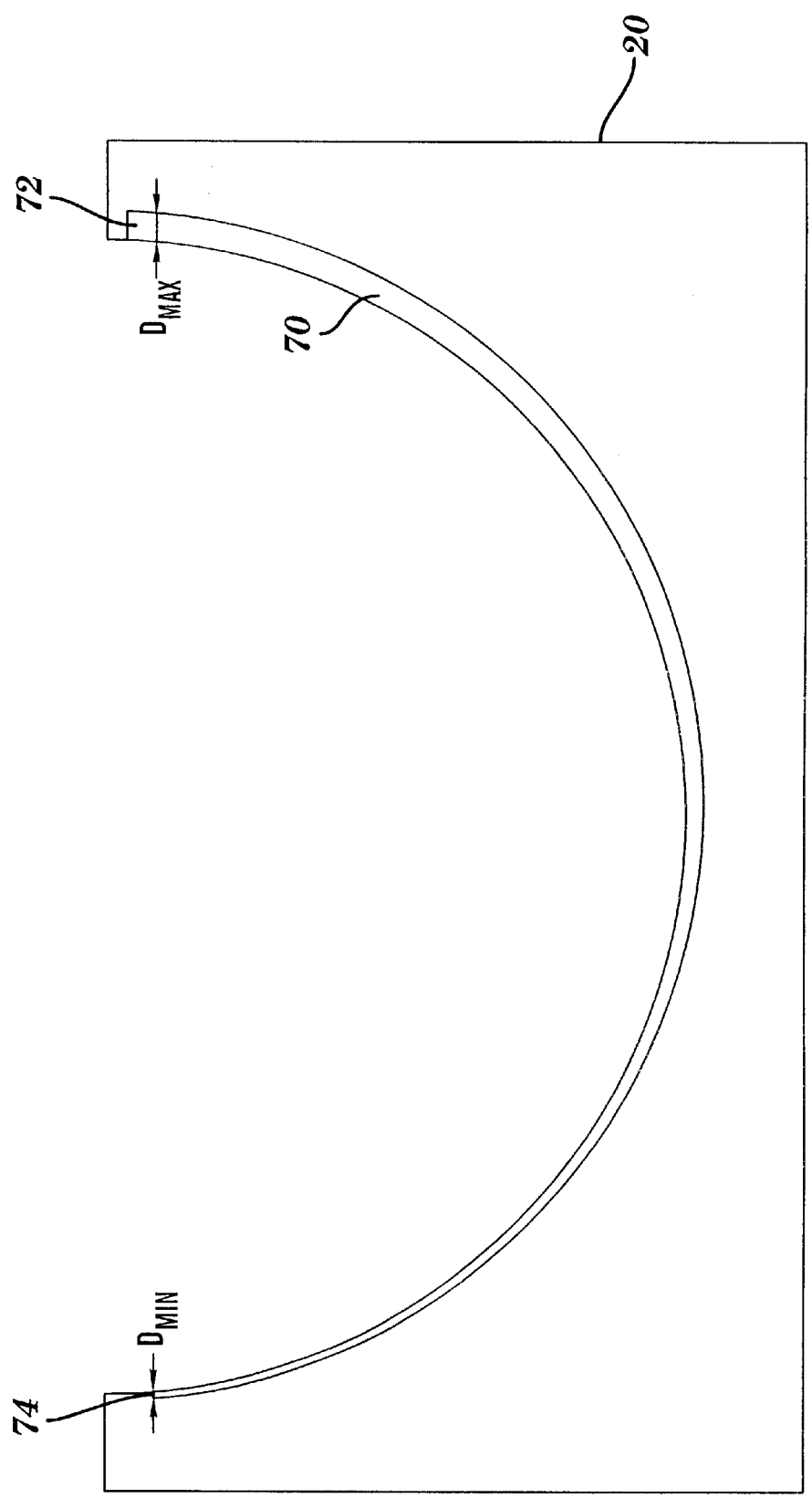
FIG. 4 is a cross-sectional view illustrating a variable cross-section vacuum groove in an internal drum in accordance with the present invention.

In the imaging system 10, the recording media 18 is held against the media support surface 22 by drawing a vacuum through a plurality of vacuum ports using a vacuum pump, venturi vacuum device, or other vacuum source. As illustrated in FIG. 2, a plurality of vacuum grooves 70, each associated with one of the vacuum ports, are formed in the media support surface 22, such that as air is drawn from a vacuum port, the air in a corresponding vacuum groove 70 is evacuated, thereby drawing the recording media 18 into contact with the media support surface 22. The vacuum grooves 70 may be organized in a wide variety of arrangements, and may be formed in a wide variety of configurations (e.g., shapes, cross-sections, etc.). Regardless of the specific arrangement and configuration of the vacuum grooves 70 used in the imaging system 10, and in accordance with the present invention, at least some (preferably all) of the vacuum grooves 70 have a variable cross-section (e.g., variable depth) that decreases with distance from the vacuum port. For example, as illustrated in FIGS. 2–4, the vacuum grooves 70 may have a linear configuration, with a variable depth and a constant groove width, and may be arranged in parallel, equally spaced, along the fast scan curvilinear direction B (FIG. 1). Alternately, the vacuum grooves 70 may be arranged in parallel, equally spaced, along the slow scan direction. In other applications, the vacuum grooves 70 may have a "zig-zag" or other non-linear arrangement, and may be arranged in a particular configuration in the media support surface 22. In addition, a single groove that "snakes" along the media support surface and which is supplied with a vacuum through one or more vacuum ports may be used. The configuration of vacuum grooves and/or each individual vacuum groove includes a decreasing cross-section.

A partial plan view of the internal drum 20 of the imaging system 10 of FIG. 1, illustrating an arrangement of variable cross-section grooves 70 in accordance with the present invention, is illustrated in FIG. 3. As shown, a plurality of equally spaced vacuum grooves 70 are arranged in parallel along the fast scan curvilinear direction. Each vacuum groove 70 has a constant width W, and a depth that varies continuously from a maximum at a vacuum port 72 to a minium at a distal end 74 of the vacuum groove. Each vacuum groove 70 is associated with a single vacuum port 72 formed in a vacuum manifold 75. A vacuum source 76 supplies a vacuum to the vacuum manifold 75, which in turn simultaneously supplies a vacuum to a selected plurality of vacuum ports 72 and associated vacuum grooves 70. Advantageously, since the depth of each vacuum groove 70 decreases continuously along its length, a substantially uniform vacuum is generated along the entire length of the plurality of vacuum grooves 70. This produces a uniform vacuum level that draws the entire area of the recording media onto the media support surface throughout the internal drum 20. This vacuum level is capable of firmly holding different sizes/types of recording media against the media support surface 22, without the need for a complex and expensive vacuum and manifold system.

A simple vacuum manifold system 120 may be used to apply a vacuum to a selected plurality of the vacuum ports 72 and associated vacuum grooves 70 according to the size of the recording media 18. As illustrated in FIG. 3, the vacuum manifold system 120 includes a piston 122 located within the vacuum manifold 75 and a drive system 124 (e.g., a lead screw and motor for rotating the lead screw) for selectively displacing the piston 122 within the vacuum manifold 75. For example, when the piston 122 is positioned at location $L_1$ by the drive system 124, a vacuum is only applied to the vacuum ports 72 and vacuum grooves 70 located between points $P_1$ and $P_2$. All of the remaining vacuum ports 72 remain blocked by the piston 122. This arrangement may be used, for example, to hold a plate $P_1$ against the media support surface 22. Similarly, when the piston 122 is positioned at location $L_2$ (shown in phantom) by the drive system 124, a vacuum is only applied to the vacuum ports 72 and vacuum grooves 70 located between points $P_1$ and $P_3$.

FIG. 4 illustrates a cross-section of a variable cross-section vacuum groove 70 in an internal drum 20 in accordance with the present invention. The vacuum groove 70 in FIG. 4 is exaggerated in size relative to the internal drum 20 to more clearly depict the variability of the groove depth. As shown, the vacuum groove 70 has a maximum depth $D_{max}$ at the vacuum port 72, a minimum depth $D_{min}$ at the distal end 74 of the vacuum groove, and a constant width. In the preferred embodiment of the present invention, the depth of the vacuum groove 70 decreases continuously along the length of the vacuum groove 70 from the vacuum port 72 to the distal end 74.

As an example, an internal drum having a length of approximately 45 inches (1143.00 mm) and a diameter of approximately 19 inches (482.60 mm) was provided with a series of 59 parallel vacuum grooves arranged along the fast scan curvilinear direction. The vacuum grooves were separated by about 0.75 inches (19.05 mm) and each had a constant width of about 0.078 inches (1.98 mm). The depth of each vacuum groove varied continuously from about 0.038 inches (0.965 mm) to about 0.006 inches (0.152 mm) (i.e., by a factor of about 6.33) along the length of the vacuum groove. A supply of recording media was placed on the internal drum and a vacuum of about 17 in-Hg (431.8 mm-Hg) was applied to each of the 59 vacuum grooves. A substantially uniform vacuum of greater than 12 in-Hg (304.8 mm-Hg) was generated along about 85% of the length of each of the 59 vacuum grooves, with a sloping decay never less than 3 in-Hg (76.2 mm-Hg) at the last inch of recording media. The vacuum was sufficient to firmly hold recording media of different sizes (e.g., 18×14.4 inches (450×360 mm) to 45.2×32 inches (1130×800 mm)) and types (e.g., 0.006 to 0.012 inches (0.152 to 0.305 mm) thick aluminum plates for a lithographic thermal process) against the media support surface of the internal drum.

Generally, for aluminum plates having a thickness of about 0.006 to 0.020 inches (0.150 to 0.500 mm), it has been found that, for an applied vacuum in the range of about X–Y in-Hg (X'–Y' mm-Hg), a sufficient vacuum level can be generated by varying the cross-section of each vacuum groove by a factor in the range of about 7 to 1 from a first end of the vacuum groove adjacent the vacuum port to a second distal end of the vacuum groove.

Figure 5:
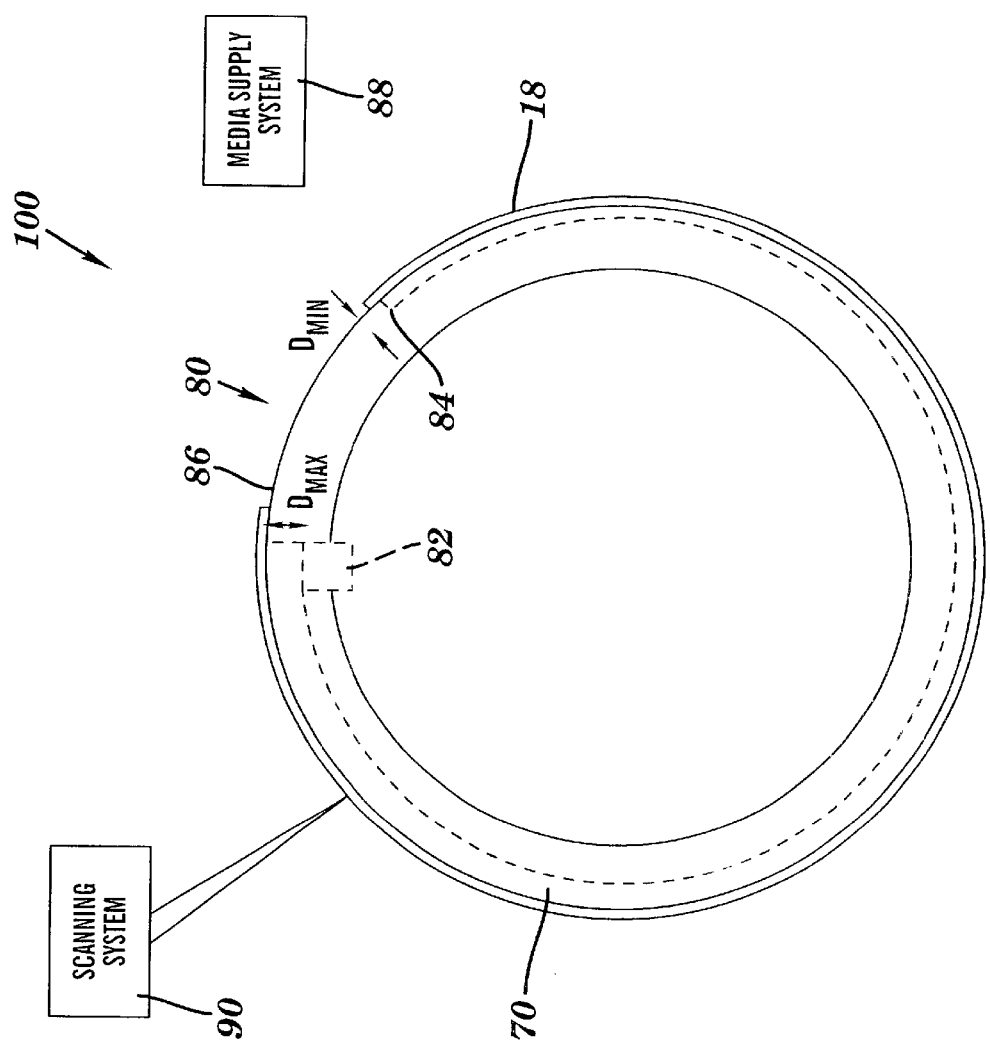
FIG. 5 is a cross-sectional view illustrating a variable cross-section vacuum groove in an external drum in accordance with the present invention.

FIG. 5 illustrates a cross-section of a variable cross-section vacuum groove 70 in an external drum 80 of an external drum imaging system 100 in accordance with the present invention. The vacuum groove 70 in FIG. 5 is again exaggerated in size relative to the external drum 80 to more clearly depict the variability of the groove depth. As shown, the vacuum groove 70 has a maximum depth $D_{max}$ at a vacuum port 82, a minimum depth $D_{min}$ at the distal end 84 of the vacuum groove, and a constant width. The depth of the vacuum groove 70 decreases continuously along the length of the vacuum groove 70 from the vacuum port 82 to the distal end 84.

A plurality of the vacuum grooves 70 are formed in a media support surface 86 of the external drum 80. As described above, the vacuum grooves 70 may be organized in a wide variety of arrangements, and may be formed in a wide variety of configurations (e.g., shapes, cross-sections, etc.), wherein at least some (preferably all) of the vacuum grooves 70 have a variable cross-section (e.g., variable depth) that decreases along their length.

A supply of recording media 18, provided by a media a media supply system 88, is held against the media support surface 86 of the external drum 80 by drawing a vacuum through a plurality of vacuum grooves 70 formed in the media support surface 86. A scanning system 90 records digital data provided by a RIP (see FIG. 1) onto the recording media 18 in a known manner (e.g., using a laser system). As known in the art, the digital data is recorded onto the recording media 18 by displacing the scanning system 90 relative to the external drum 80. This may be accomplished in a number of ways, including a rotation of the external drum 80 along with a lateral translation of the scanning system, a rotation and translation of the external drum past a stationary scanning system, etc.

Since the depth of each vacuum groove 70 decreases continuously along its length, a substantially uniform vacuum is generated along the entire length of the plurality of vacuum grooves 70. This produces a more uniform vacuum level around the external drum 80, which is capable of firmly holding different sizes/types of recording media against the media support surface 86.

Figure 6:
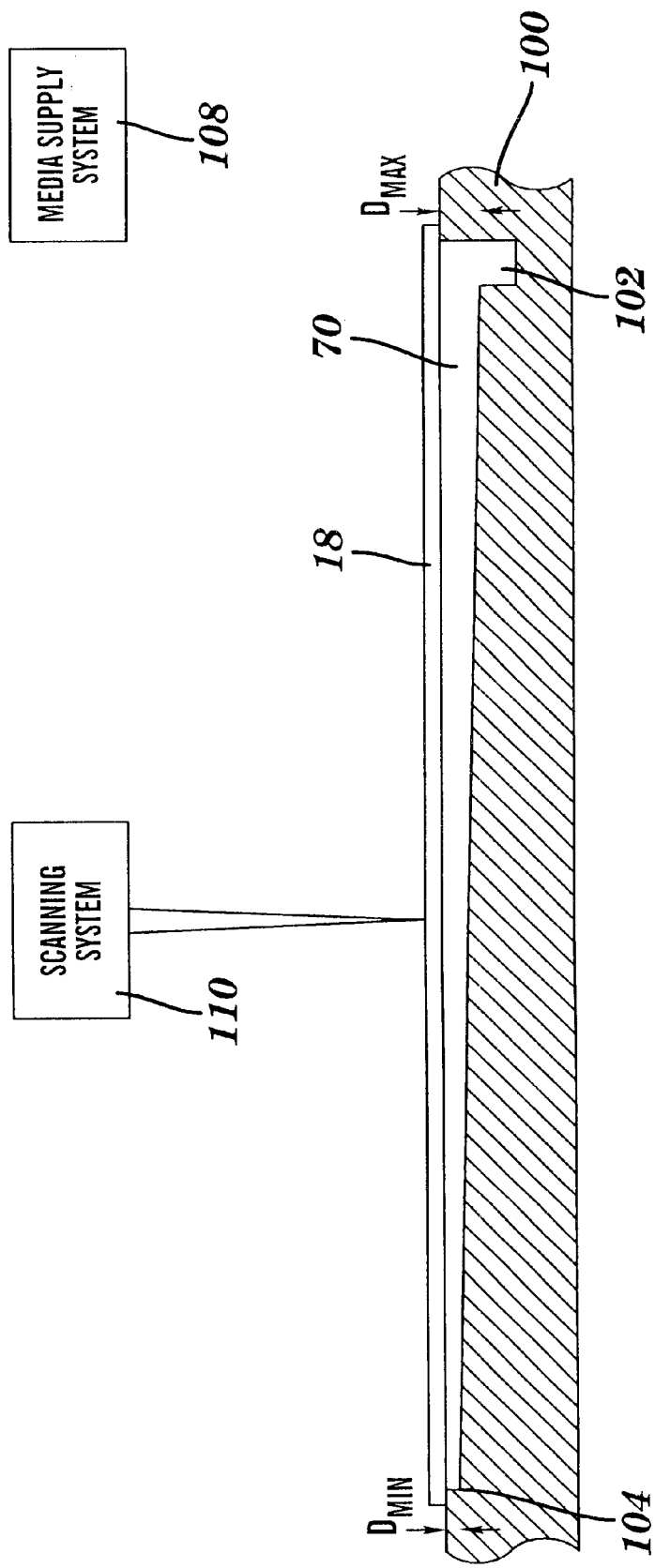
FIG. 6 is a cross-sectional view illustrating a variable cross-section vacuum groove in an planar media support surface in accordance with the present invention.

FIG. 6 illustrates a cross-section of a variable cross-section vacuum groove 70 in an imaging system that includes a planar media support surface 100. The vacuum groove 70 in FIG. 6 is again exaggerated in size relative to the media support surface 100 to more clearly depict the variability of the groove depth. As shown, the vacuum groove 70 has a maximum depth $D_{max}$ at a vacuum port 102, a minimum depth $D_{min}$ at the distal end 104 of the vacuum groove, and a constant width. The depth of the vacuum groove 70 decreases continuously along the length of the vacuum groove 70 from the vacuum port 102 to the distal end 104.

A plurality of the vacuum grooves 70 are formed in the media support surface 100. The vacuum grooves 70 may be organized in a wide variety of arrangements, and may be formed in a wide variety of configurations (e.g., shapes, cross-sections, etc.), wherein at least some (preferably all) of the vacuum grooves 70 have a variable cross-section (e.g., variable depth) that decreases along their length. For example, a plurality of the vacuum grooves 70 may be arranged in parallel, equally spaced, along the media support surface 100.

A supply of recording media 18, provided in a known manner by a media a media supply system 108, is held against the media support surface 100 by drawing a vacuum through a plurality of vacuum grooves 70 formed in the media support surface 100. A scanning system 110 records digital data provided onto the recording media 18 in a known manner (e.g., using a laser system).

Figure 7A:
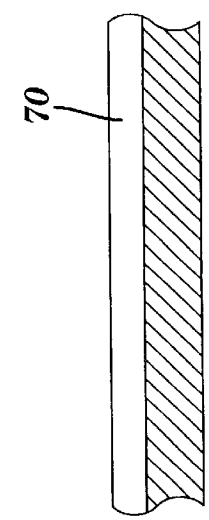
FIGS. 7A and 7B illustrate a cross-sectional and plan view, respectively, of a variable cross-section vacuum groove having a constant depth and variable width.
Figure 7B:
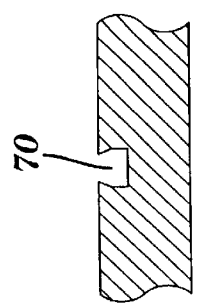
Figure 9A:
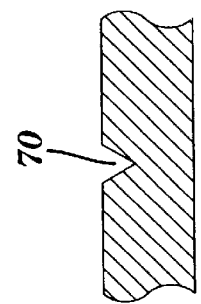
FIGS. 9A and 9B illustrate examples of possible polygonal groove cross-sections.
Figure 9B:
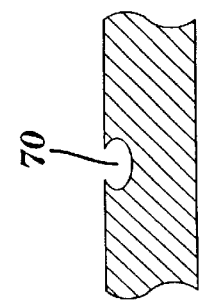
Figure 8A:
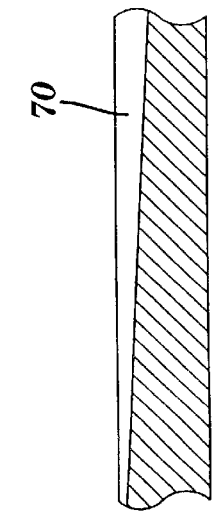
FIGS. 8A and 8B illustrate a cross-sectional and plan view, respectively, of a variable cross-section vacuum groove having a variable depth and variable width.
Figure 8B:
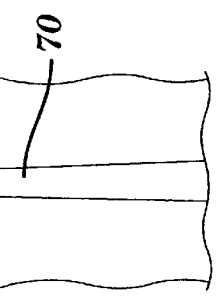
Figure 10A:
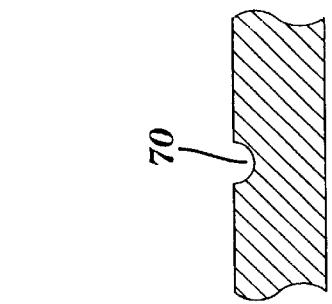
FIGS. 10A and 10B illustrate examples of possible arcuate groove cross-sections.
Figure 10B:
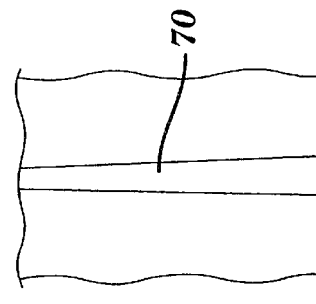

As detailed above, each vacuum groove 70 is formed with a variable cross-section that decreases along its length. In the preferred embodiment, each vacuum groove 70 has a constant width and a depth that decreases along its length. Many other cross-sectional configurations or combinations of cross-sectional configurations are also possible. For example, as illustrated in FIGS. 7A and 7B, vacuum groove 70 may have a constant depth and a width that decreases along its length, thereby providing a decreasing cross-section. Alternately, as shown in FIGS. 8A and 8B, the vacuum groove 70 may have both a variable depth and a variable width along its length. The vacuum groove 70 may have a polygonal cross-section other than the rectangular cross-section detailed above. Examples of different polygonal cross-sections are illustrated in FIGS. 9A and 9B. The vacuum groove 70 may also have an arcuate configuration as shown in FIGS. 10A and 10B. Regardless of the specific cross-sectional configuration, the cross-section of each vacuum groove decreases in some manner, continuously or discretely, along its length.

The foregoing description of the present invention has been presented for purposes of illustration and description. It is not intended to be exhaustive or to limit the invention to the precise form disclosed, and many modifications and variations are possible in light of the above teaching. For example, although the variable cross-section grooves of the present invention are described for use in imaging systems, it should be readily apparent that the variable cross-section grooves could be used in any type of system wherein a supply of a material is to be held against a support surface using a vacuum. Such modifications and variations that may be apparent to a person skilled in the art are intended to be included within the scope of this invention as defined by the accompanying claims.

What is claimed is:

1. An apparatus comprising:
   an external drum media support surface; and
   at least one variable depth vacuum groove in the media support surface, wherein a depth of each vacuum groove varies continuously along a length of the vacuum groove.

2. The apparatus according to claim 1, wherein each vacuum groove has a constant width.

3. The apparatus according to claim 1, wherein a plurality of the vacuum grooves are arranged in parallel.

4. The apparatus according to claim 1, further including a vacuum source for supplying a substantially uniform vacuum generated along a length of each vacuum groove.

5. The apparatus according to claim 1, further including a vacuum port connected to each vacuum groove, each vacuum groove comprising a cross-section which decreases with distance from the vacuum port.

6. An imaging system comprising:
   a supply of recording media;
   an external drum media support surface for supporting a supply of recording media;
   at least one variable cross-section vacuum groove in the media support surface, wherein a depth of each vacuum groove varies continuously along a length of the vacuum groove;
   a vacuum system for applying a vacuum to each vacuum groove to hold the recording media against the media support surface; and
   a system for recording image data onto the recording media.

7. The imaging system according to claim 6, wherein a depth of each vacuum groove varies along a length of the vacuum groove.

8. The imaging system according to claim 6, wherein a width of each vacuum groove varies along a length of the vacuum groove.

9. The imaging system according to claim 6, wherein at least one dimension of each vacuum groove varies along a length of the vacuum groove.

10. The imaging system according to claim 6, wherein each vacuum groove has a constant width.

11. The imaging system of claim 6, wherein each vacuum groove has a constant depth.

12. The imaging system of claim 6, wherein a plurality of the vacuum grooves are in parallel.

13. The apparatus according to claim 6, wherein the vacuum system supplies a substantially uniform vacuum generated along a length of each vacuum groove.

14. The imaging system according to claim 6, wherein the cross-section of each vacuum groove varies by a factor in the range of about 7 to 1 from a first end of the vacuum groove to a second end of the vacuum groove.

15. The imaging system according to claim 14, wherein the first end of the vacuum groove is connected to a vacuum port, and wherein the vacuum system applies a vacuum to the vacuum groove through the vacuum port.

16. An external drum imaging apparatus for recording an image onto media, said apparatus comprising:
   an external drum support surface for supporting the media; and at least one variable cross-section vacuum groove in the support surface, wherein the cross-section of each vacuum groove varies by a factor in the range of about 7 to 1 from a first end of the vacuum groove to a second end of the vacuum groove.

17. The apparatus of claim 16, wherein each vacuum groove has a constant width.

18. The apparatus of claim 16, wherein a plurality of the vacuum grooves are arranged in parallel.

19. The apparatus of claim 16, further comprising a vacuum source for applying a substantially uniform vacuum along a length of each vacuum groove.

20. The apparatus of claim 16, further comprising a vacuum port connected to each vacuum groove, wherein each vacuum groove has a cross-section which decreases with distance from the vacuum port.

* * * * *